United States Patent [19]

Weiler et al.

[11] Patent Number: 5,002,160
[45] Date of Patent: Mar. 26, 1991

[54] SPOT-TYPE DISC BRAKE WITH VENTILATION CHANNEL

[75] Inventors: Rudolf Weiler; Winfried Gerhardt; Wolfgang Schiel, all of Frankfurt am Main; Ludwig Dreilich, Kronberg, all of Fed. Rep. of Germany

[73] Assignee: Alfred Teves GmbH, Frankfurt am Main, Fed. Rep. of Germany

[21] Appl. No.: 25,333

[22] Filed: Mar. 13, 1987

[30] Foreign Application Priority Data

Mar. 13, 1986 [DE] Fed. Rep. of Germany ....... 3608317

[51] Int. Cl.⁵ .............................................. F16D 65/78
[52] U.S. Cl. .............................. 188/71.6; 188/264 AA
[58] Field of Search .......... 188/264 AA, 71.6, 264 A, 188/218 R, 218 XL, 71.1; 192/113 A

[56] References Cited

U.S. PATENT DOCUMENTS

| 3,208,559 | 9/1965 | Chambers et al. | 188/264 AA |
| 3,637,053 | 1/1972 | Boyles | 188/71.1 |
| 3,729,069 | 4/1973 | Klein et al. | 188/71.1 |
| 4,031,986 | 6/1977 | Thompson | 188/71.1 |
| 4,440,270 | 4/1984 | Ross | 188/71.6 |

FOREIGN PATENT DOCUMENTS

| 1913910 | 1/1965 | Fed. Rep. of Germany . | |
| 1213178 | 3/1966 | Fed. Rep. of Germany . | |
| 2618990 | 11/1976 | Fed. Rep. of Germany . | |
| 8236515 | 6/1984 | Fed. Rep. of Germany . | |
| 3438142 | 4/1986 | Fed. Rep. of Germany | 188/264 AA |
| 3440324 | 5/1986 | Fed. Rep. of Germany | 188/264 AA |
| 1351759 | 12/1964 | France | 188/71.6 |
| 1112906 | 5/1968 | United Kingdom . | |
| 1216809 | 12/1970 | United Kingdom . | |
| 1223412 | 2/1971 | United Kingdom . | |
| 1262263 | 2/1972 | United Kingdom . | |
| 2036214 | 6/1980 | United Kingdom | 188/71.6 |
| 2087997 | 6/1982 | United Kingdom | 188/71.1 |
| 2181199 | 4/1987 | United Kingdom | 188/264 AA |

OTHER PUBLICATIONS

Detroit Notebook-p. 28, "Brake and Front End", 9/1977.

Primary Examiner—Robert J. Oberleitner
Assistant Examiner—Mark T. Le
Attorney, Agent, or Firm—Robert P. Seitter; J. Gordon Lewis

[57] ABSTRACT

A spot-type disc brake, in particular for motor vehicles, comprises a brake housing enclosing the rim of a brake disc and further comprising brake pads arranged on both sides of the brake disc and still further comprising at least one piston-cylinder-type actuating device. In order to reduce the influence of the heat generated during braking, the brake housing is formed with at least one ventilation channel arranged close to the brake disc beside a brake pad shaft which accommodates the brake pads.

11 Claims, 2 Drawing Sheets 5,002,160

SPOT-TYPE DISC BRAKE WITH VENTILATION CHANNEL

BACKGROUND OF THE INVENTION

The present invention relates to a spot-type disc brake and in particular a spot type disc brake for motor vehicles.

Disc brakes of the type disclosed herein are known from the Brake Handbook of Alfred Teves GmbH, 8th revised edition, published by Bartsch-Verlag, Ottobrunn near Munich. With these known disc brakes, which are designed as fixed-caliper disc brakes, problems may occur when they are used as high-performance brakes because of the heat generated during braking.

An object of the present invention, therefore, is to create a spot-type disc brake in which the disadvantageous effect of the heat generated during braking is greatly reduced.

SUMMARY OF THE INVENTION

According to the invention on essentially circumferential ventilation channel is provided close to the brake disc and intersecting the brake pad shaft accommodating the brake pads. Thus, an airflow which is caused by the relative wind and/or the rotation of the brake disc, blows against the brake pads when the vehicle is in motion. This airflow carries away heat so that it can have no negative effect.

A preferred embodiment of the invention provides that the brake housing is connected stationarily to a part fixed to the vehicle and on each side of the brake disc and includes at least one piston-cylinder-type actuating device. In such a disc brake, the solution proposed by the invention has a particularly advantageous effect, since here the pressure medium must be guided over the edge of the disc brake to the piston-cylinder-type actuating device. The piston-cylinder-type actuating device is usually arranged inside the wheel dish and this device along with the brake part accommodating it, heat up due to their largely closed arrangement within the wheel dish. Accordingly, the measures proposed by the present invention are particularly effective.

In a convenient manner, the ventilation channel is designed as an opening formed in the housing. It is conveniently arranged on the exit side relative to the direction of rotation of the brake disc. A particularly expedient solution is thus provided when the opening extends or is open in an axial and/or radial direction.

An advantageous embodiment of the invention provides that the brake housing is made in two parts and that each part of the housing forms one portion of the ventilation channel.

The brake housing conveniently has the usual U-shape with two radially extending legs connected with each other by a bridge portion. At least one radially extending leg is formed with one axial opening. Viewed in radial direction, the opening is arranged close to the brake pads. A further advantageous embodiment of the invention provides that the brake housing comprises a recess arranged above the brake disc and this recess is bridged by a member forming a pressure fluid conduit for the piston-cylinder-type actuating device. This arrangement forms a heat shield towards the brake disc because the recess is not open towards the brake disc. However, the pressure medium channel running through the member is separated by two air cushions from the heat-radiating brake disc so that there is very little heat transmission. In order to obtain further improved ventilation in a tangential direction, a further embodiment provides that a channel extends in a circumferential direction close to the brake pads and that this channel is of a width in the axial direction that corresponds to the greatest axial dimension of the brake pads when newly installed. In this condition, when the pistons of the actuating devices are in their retracted position, air can nevertheless flow through the wide channel and along the rear side of the brake pads. In order to impair the airflow in this embodiment as little as possible, narrow projections are provided which project axially into the channel to support the brake pads. The projections are of very little height, in the order of approximately 1 cm, so that the free cross-section is reduced as little as possible.

Protection is also sought for a brake pad to be used in a spot-type disc brake according to the present invention. According to a further embodiment of this invention, the pad comprises a rear plate provided in the area of the piston with projections, such as knobs or the like, facing the pistons. This design of the brake pad allows a further improvement of the ventilation in a circumferential direction, since the air flowing through the channel extending in the circumferential direction can now pass along the rear side of the brake pads.

The projections are expediently manufactured by stamping through from the side of the friction pads. In order to facilitate the insertion and extraction of the brake pads, slip chamfers are provided at the lateral edges of the rear plates.

BRIEF DESCRIPTION OF THE DRAWINGS

An embodiment of the present invention and of its further developments is illustrated in the drawings and described hereinafter.

In the drawings.

DETAILED DESCRIPTION OF A PREFERRED EMBODIMENT

Figure 2:
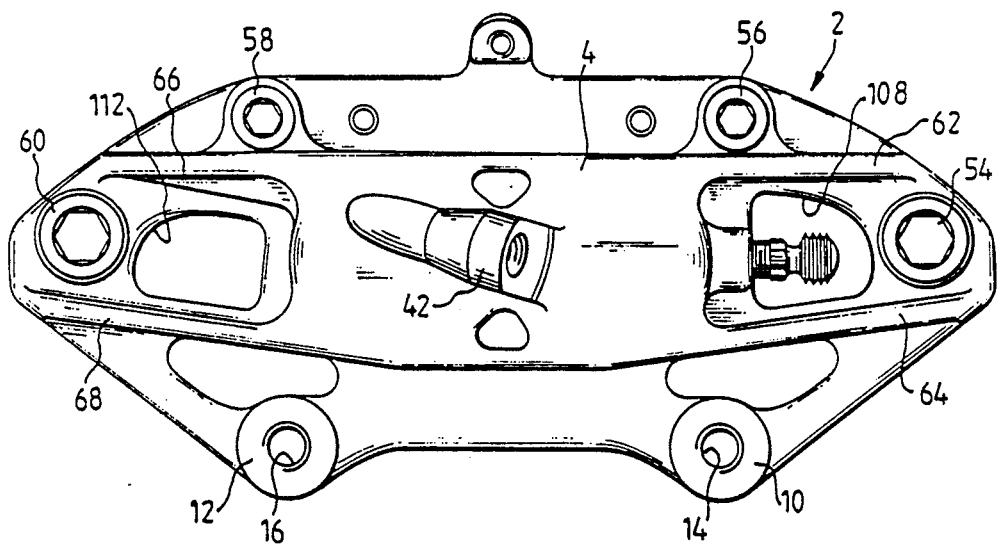
FIG. 2 shows a side view of the spot-type disc brake according to FIG. 1 from inside.

The fixed-caliper disc brake 2 illustrated in the drawings has a cross-section which in longitudinal section is U-shaped and forms two radially extending legs 4, 6 which are connected with each other by a bridge portion 8. The inner leg 4, that is the one facing the center of the vehicle when installed, comprises two fastening lugs 10, 12 which are provided with threaded bores 14, 16 in order to fasten the brake to a part fixed to the vehicle, for example the steering knuckle. The inner leg 4 accommodates two actuating devices 18, 20 comprising pistons 26, 28 axially slidingly arranged in cylinder bores 22, 24. The opposite outer leg 6 also contains two actuating devices 30, the second actuating device not being visible, which are designed as pistons 34 slidable in cylinder bores 38. For the supply of pressure medium to the cylinder bores 22, 24, and 38, a connection 42 for a conduit for the pressure medium is provided on the inner leg 4. From the connection 42, a channel 44 extends at an acute angle relative to the axis of the cylinder bore and leads to the circumferential area of the cylinder bore 24 which it intersects in a small area so that pressure medium can be fed to the cylinder bore. A further channel poriton 46 extends as the straight continuation of the channel portion 44 in the leg 4. In the approximate area where the leg 4 meets the bridge protion 8, the channel portion 46 connects with an axially parallel channel portion 48. The channel portion 48 in turn is connected to a channel portion 50 which extends at an acute angle relative to the axes of the cylinder bores. The channel portion 50 leads to the edge of the cylinder bore 38. The cylinder bores 22, 24 on the one hand and 38, 40 on the other hand are connected via connecting channels, one of which, 52, is shown as connecting the cylinder bores 22 and 24. A similar connecting channel connects the bores 38 and 40.

The brake housing 2 is designed in two parts of which the joint face runs parallel to the brake disc plane and is located where the channel portion 48 meets the channel portion 50. The two housing parts are held together by four screws 54, 56, 58, and 60 extending perpendicular to the brake disc plane. Stiffening ribs 62, 64, 66, 68 and/or 70, 72, 74, and 76 are formed on the legs 4, 6 in such a way that the brake housing has a stiff, frame-type structure. The stiffening ribs, which extend at a small angle to the tangential direction, in the middle part pass over to that part of the legs 4, 6 accommodating the actuating devices.

For accommodation of the brake pads 78, 80 a brake pad shaft 82 is provided in the bridge portion 8 and is formed as an opening of rectangular cross-section in the bridge portion. The rear plates 84, 86 of the brake pads 78, 80 lie against shaft walls 88, 90 that extend parallel to the brake disc plane. In circumferential direction, the lateral surfaces of the brake pads 78, 80 are supportable on lateral shaft walls 92, 94 extending parallel to the brake disc axis. The shaft walls 92 and 94 have corresponding supporting surfaces. To hold the brake pads 78, 80 in the brake pad shaft 82, two pad holding pins 96, 98 are provided which extend with play parallel to the brake disc axis through holes (not shown) in the rear plates 84, 86 and are anchored in the shaft walls 88, 90. In order to keep the brake pads 78, 80 from clattering, a cross spring 100 is provided with one leg resting on the rear plates 84, 86 and the other leg gripping under the pad holding pins 96, 98 in order to provide a springy bracing connection of these two parts.

Figure 1:
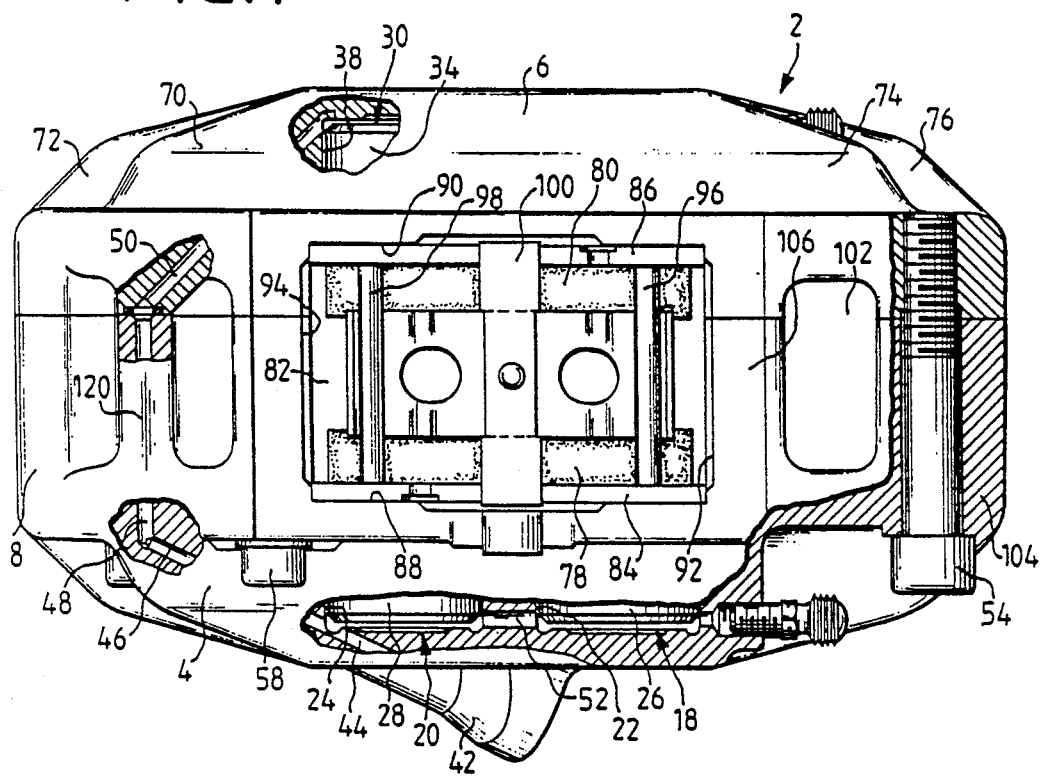
FIG. 1 shows a top view of a spot-type disc brake in accordance with this invention.
Figure 3:
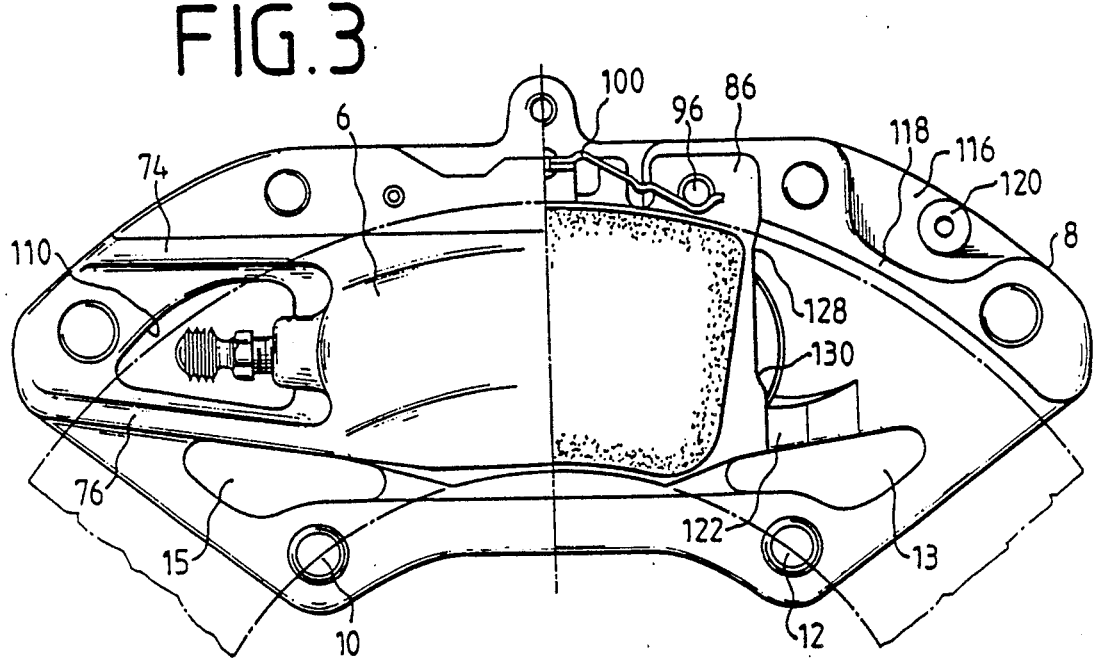
FIG. 3 shows a side view of the disc brake according to FIGS. 1 and 2 from outside, with the right half broken away.

As shown in FIGS. 1 and 3, an opening 102 is provided on one side of the brake housing 2 beside the pad shaft. The opening 102 has a substantially rectangular form and is arranged with one of its parts in each of the two housing halves. Only axial webs 104, 106 remain of the housing as a consequence of the opening 102, through which webs the screws 54, 56 extend. Viewed in circumferential direction, the opening is radially drawn down to such an extent that air can flow in the circumferential direction. Inside the legs 4, 6, axial openings 108, 110 arranged approximately opposite each other and of substantially the same shape are provided between the stiffening ribs. Corresponding openings 112 (only one is shown) are arranged on the opposite side of the brake pad shaft 82 in the legs. On that side of the pad shaft, a recess 116 extending in the area above the brake disc and in part above the brake pads is provided.

The recess 116 in top view has an approximately rectangular form and in cross-section is curved as seen particularly in FIG. 3. At a distance from the bottom 118 of said recess, a member 120 is arranged which bridges the recess 116 in an axial direction and accommodates a part of the channel portion 48. Thus, a double air-insulation space is created between the brake disc and the bottom 118, on the one hand, and the bottom 118 and the member 120, on the other hand, so that the pressure medium channel is very effectively protected against heat in that particularly critical area. If necessary, the member 120 can be connected with the bottom 118 for reasons of casting practice via a narrow connecting section.

Figure 4:
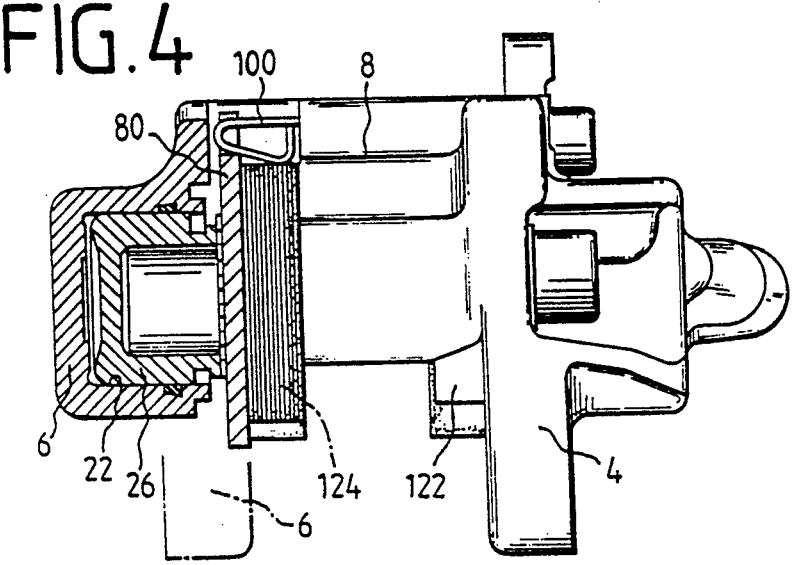
FIG. 4 shows a longitudinal section through the disc brake illustrated in FIGS. 1 to 3.
Figure 5:
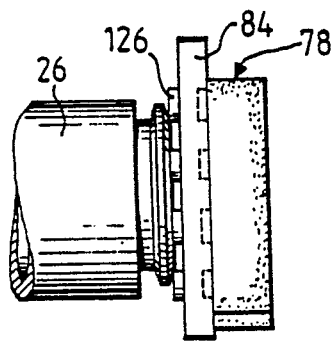
FIG. 5 shows an enlarged view of a piston and brake pad arrangement used in FIGS. 1-4.

As is shown in particular in FIGS. 1 and 4, an air channel extending in a circumferential direction is formed by the brake housing 2. The inflow area of said channel is formed by the brake housing in the area of the openings 102, 108, and 110. The cross-section of the channel is somewhat larger in axial direction than the greatest axial dimension of the brake pads 78, 80 when completely retracted, as will be seen from FIGS. 1 and 4. Thus, air can be supplied through the air channel to the rear side of the brake pads 78, 80. In order to contract the channel cross-section as little as possible, projections or noses 122, 124 facing the brake disc are provided at the legs 4, 6, which projections or noses support the brake pads 78, 80 at the radially inner area, as will be seen from FIGS. 3 and 4. The radial height of the noses is relatively little and ranges approximately from 0.8 to 1.2 cm so that the free passage is hindered as little as possible. As is shown in particular in FIG. 5, the brake pads 78, 80 comprise on their rear plates 84, 86 projections in the form of knobs 126 or the like facing the pistons. Said projections can be arranged, for example, in annular form to correspond to the piston front end and can be manufactured by stamping through. In order to allow the brake pads 78, 80 to be inserted in the pad shaft and extracted from it easily, slip chamfers 128, 130 are provided adjacent to the lateral supporting surfaces, as illustrated in FIG. 3.

Inside the leg 4 of the brake housing 2, above the fastening lugs 10, 12, through-going turbulence openings 13, 15 are provided which are substantially kidney-shaped.

What is claimed is:

1. A spot-type disc brake for motor vehicles comprising a brake housing enclosing a brake disc and brake pads arranged on both sides of the brake disc, piston-cylinder-type actuating means for operating said brake pads, the brake housing comprising at least one ventilation channel adjacent to and intersecting a brake pad shaft in which the brake pads are accommodated, said ventilation channel being open at both ends thereof for permitting a continuous flow of atmospheric air through the brake housing during and in response to vehicular motion to conduct heat away from said brake pads and said actuating means and wherein at least the forward end of said channel opens in the direction of rotation of said brake disc.

2. The spot-type disc brake of claim 1 wherein the brake housing is connected stationarily to a part fixed to the vehicle and wherein the piston actuating means is on each side of the brake disc.

3. The spot-type disc brake of claim 1 wherein the ventilation channel includes an opening formed in the brake housing.

4. The spot-type disc brake of claim 3 wherein the ventilation channel opening is located on an existing side of the brake housing with respect to rotation of the brake disc.

5. The spot-type disc brake of claim 3 wherein the opening extends in both axial and radial directions.

6. the spot-type disc brake of claim 1 wherein the brake houisng is formed in two parts and wherein each housing part forms a portion of the ventilation channel.

7. The spot-type disc brake of claim 1 wherein the radially extending legs of the brake housing form an axial opening.

8. The spot-type disc brake of claim 7 wherein the axial opening is located in radial direction and at brake pad level.

9. the spot-type disc brake of claim 1 wherein the brake housing comprises a recess located close to the brake disc, said recess being bridged by a member forming a pressure fluid conduit for the piston-cylinder-type actuating means said member being located at a distance from the bottom of the recess.

10. The spot-type disc brake of claim 1 wherein said channel extends in a circumferential direction and passes around the brake pads and is of a size in axial direction at least as wide as a greatest axial dimension of the brake pads when newly installed.

11. The spot-type disc brake of claim 10 wherein axially extending projections project into the channel to support the brake pads.

* * * * *